United States Patent [19]

Wilder et al.

[11] Patent Number: 5,661,726

[45] Date of Patent: Aug. 26, 1997

[54] ADVANCED COMMUNICATION SYSTEM ARCHITECTURE

[75] Inventors: David Earl Wilder; Steven R. Blackwell, both of Huntsville; Charles E. Polk, Jr., Athens; David Paul Nelson, Huntsville, all of Ala.

[73] Assignee: Motorola, Inc., Schaumaburg, Ill.

[21] Appl. No.: 559,887

[22] Filed: Nov. 20, 1995

Related U.S. Application Data

[63] Continuation of Ser. No. 285,260, Aug. 3, 1994, abandoned.

[51] Int. Cl.$^6$ ........................................ H04Q 11/04
[52] U.S. Cl. ........................ 370/445; 370/458; 370/463
[58] Field of Search ................................. 370/445, 447, 370/458, 459, 462, 463, 489

[56] References Cited

U.S. PATENT DOCUMENTS

| | | | |
|---|---|---|---|
| 4,755,990 | 7/1988 | Bohler et al. | 370/85.3 |
| 4,885,761 | 12/1989 | Douskalis | 370/67 |
| 4,885,996 | 12/1989 | Douskalis | 370/85.1 |
| 4,975,903 | 12/1990 | Wakerly et al. | 370/67 |
| 5,099,473 | 3/1992 | Gupta et al. | 370/56 |
| 5,194,066 | 3/1993 | Sutterlin | 370/85.3 |
| 5,361,063 | 11/1994 | Jaffe et al. | 370/85.3 |
| 5,383,183 | 1/1995 | Armbruster et al. | 370/85.3 |

Primary Examiner—Benedict V. Safourek
Assistant Examiner—Ricky Q. Ngo
Attorney, Agent, or Firm—J. Ray Wood

[57] ABSTRACT

A communication system for coupling a plurality of data terminals to a telephone network has a time division multiplexed telephone network access bus, providing a plurality of time division slots containing data, coupled to the telephone network, and a digital terminal access bus coupled to the plurality of communication devices, each communication device being configurable to access any of the time division slots. A controller for configures each communication device to access a time division slot.

44 Claims, 2 Drawing Sheets

ADVANCED COMMUNICATION SYSTEM ARCHITECTURE

This is a continuation of application Ser. No. 08/285,260, filed Aug. 3, 1994 and now abandoned.

FIELD OF THE INVENTION

This invention relates to telecommunication systems; specifically, it is related to rack mounted communication interfaces.

BACKGROUND OF THE INVENTION

In a central site installation, a large number of remote users access a central computer system or data base. They may use data communication devices (DCDs) operating over a variety of network services such as PSTN (public switched telephone network), leased line analog service, leased line digital services such as DDS and fractional T1, and switched digital services such as ISDN (integrated services digital network), Datapath, and switched 56 K services.

A large number of connections to the telephone network are required, as well as a large number of communication ports on the host central computer. FIG. 1 shows a prior art communication system. A LAN (local area network), WAN (wide area network) or mainframe computer 10 is connected to a multi-port I/O (input/output) concentrator 12. A rack 14 of analog modems 16 is connected to the concentrator 12. Each analog modem 16 has a separate connection to the concentrator 12. The rack 14 is connected to a 1.544 megabits per second (Mbps) T1 channel bank 18 (usually provided with analog voice cards). The T1 channel bank 18 is coupled to public switched telephone network 20 by T1 line 22. Remote modems 24 coupled the remote user's systems 26 to the public switched telephone network 20 by way of analog lines 28.

Such a system has a number of problems. Reconfiguration is difficult because all of the components must be cable together individually. Changing a T1 time slot assignment or replacing a failed modem would require physically moving devices (such as cards) and cabling. Redundancy is available, but only at the expense of providing additional host ports and telephone network connections.

A system that reduces the number of telephone network connections and host system ports while providing simplified reconfiguration and redundancy is thus highly desirable.

DESCRIPTION OF THE PREFERRED EMBODIMENT

Figure 1:
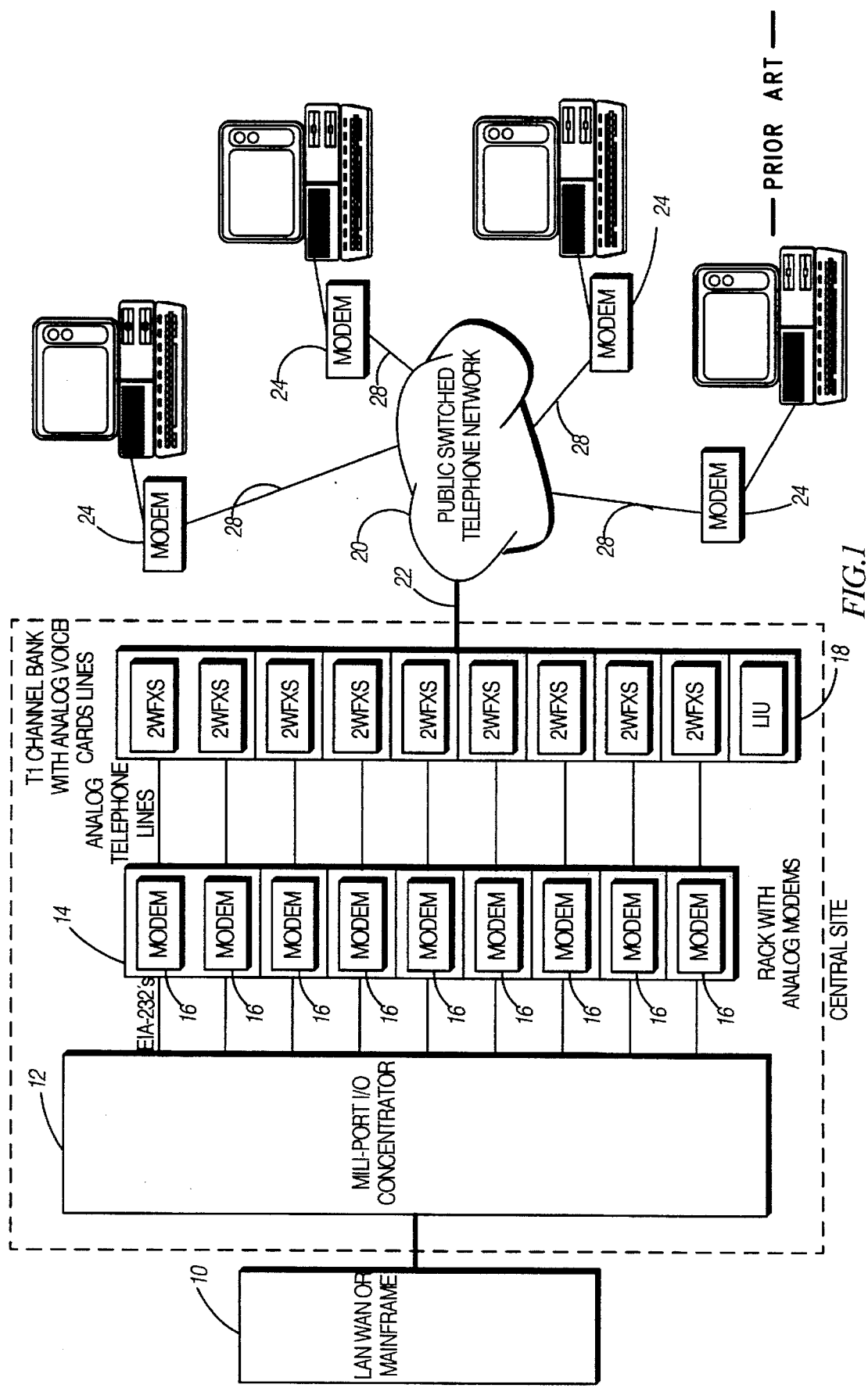
FIG. 1 is a prior art communication system.
Figure 2:
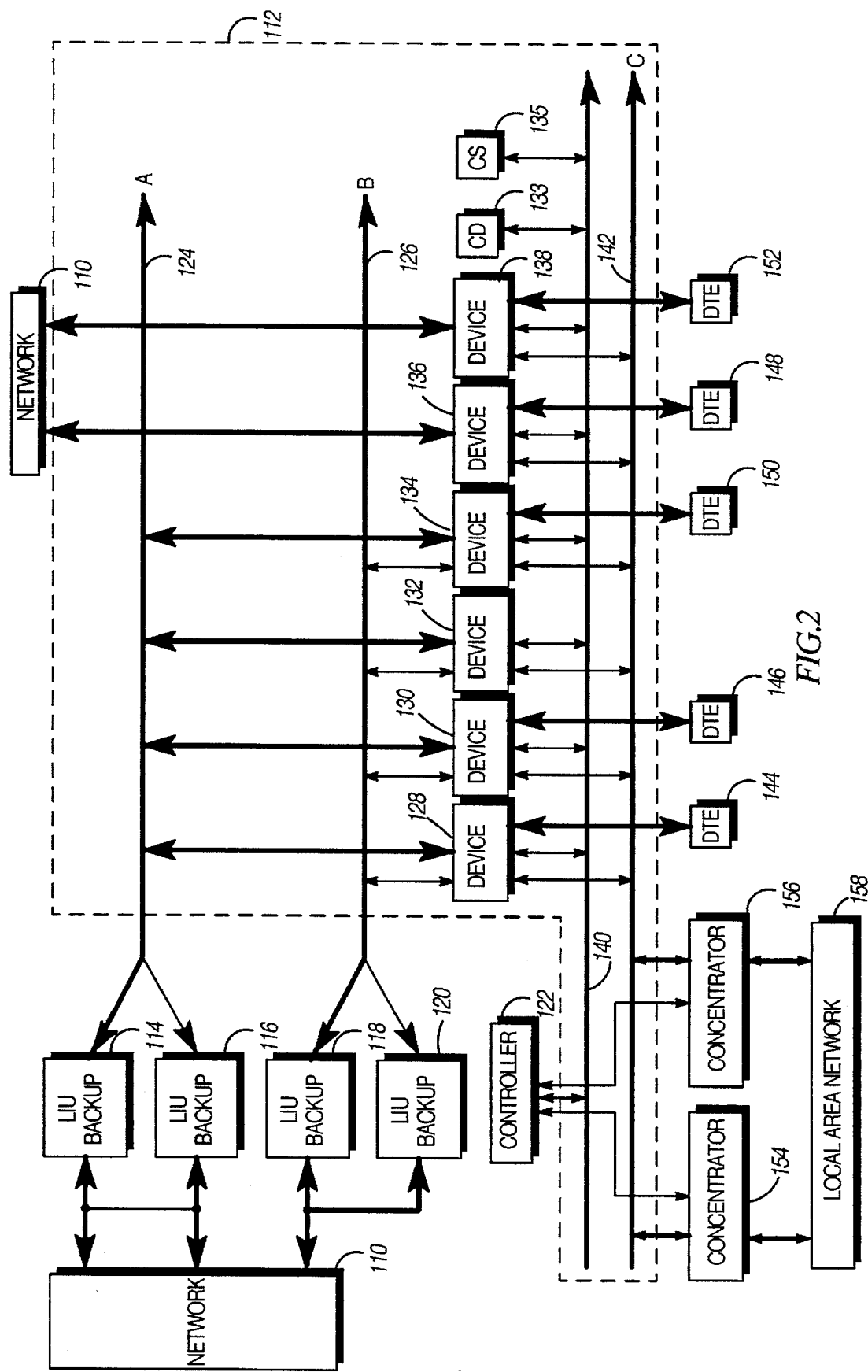
FIG. 2 is a block diagram of a communication configured in accordance with the invention.

FIG. 2 shows a communication system configured in accordance with the invention. Network 110 coupled to a data communication system 112. Data communication system 112 is coupled to the network through a plurality of line interface units 114, 116, 118, 120.

Line interface units (LIUs) 114, 116, 118, 120 may perform a variety of functions converting signals from network 110 into data to be used by the data communication system 112, and vice versa. For example, if network 110 were a T1 interface to the public switched telephone network, then LIUs 114, 116, 118, 120 would perform all of the required data transmission and reception functions for accessing the twenty-four 64 Kbps (kilobits per second) channels comprising the 1.544 Mbps data stream, including: signal equalization, timing recovery, frame alignment, signaling reception and transmission, and data encoding and decoding. In addition, the LIUs format the data and provide timing information for the other data communications devices in the system.

LIUs 116, 120 are backup LIUs. In case of a failure of the primary LIUs 114, 118, then controller 122 would enable the backup LIUs 116, 120 to operate in place of the failed LIUs.

LIUs 114, 116 are coupled to a first time division multiplexed telephone network access bus 124. As is well known, time division multiplexing consists of multiplexing access from multiple data streams into a single higher rate data stream by interleaving data according to a predefined scheme. For example, in a T1 system, a single 1.544 Mbps data stream is composed of the aggregation of twenty-four 64 Kbps data streams (DSOs) plus an 8 Kbps synchronization pattern. In T1, frames, which consist of 8 bits from each of the twenty-four DSOs plus a single framing bit, are created at the rate of 8000 per second. These aggregated frames are sent across the network and demultiplexed at the receiving end into their twenty-four constituent DSOs.

The time division slots have different durations, or the time division slots could have the same duration. LIUs 118, 120 are coupled to a second time division multiplexed telephone network access bus 126. The second time division multiplexed telephone network access bus 126 may be used to access a telephone network other than telephone network 10.

Alternatively, the second time division multiplexed telephone network access bus 126 may be coupled to the same telephone network 10 as a backup. Thus, if for some reason if the first time division multiplexed telephone network access bus 124 failed, then the system 112 could continue operating.

The first and second time division multiplexed telephone network access busses 124, 126 are coupled to a plurality of communication devices 128, 130, 132, 134. Communication devices 128 could be modems, digital signal units, ISDN terminal adapters, or even analog telephone adapters. Communication devices 128 provide a mechanism for a user to transport data or voice information across the time division multiplexed network 110.

Communication devices 136, 138 are directly connected to network 110. Data to communication devices 136, 138 is coming directly from the network 110.

All of the devices 128, 130, 132, 134, 136, 138, 114, 116, 118, 120, 154, 156 are coupled to the serial management bus 140. The serial management bus 140 is coupled to controller 122. The serial management bus 140 provides a mechanism whereby the controller 122 can access control, setup and performance information for each communication device, LIU and concentrator.

Communication devices 136, 138 are directly connected to network 10. Data to communication devices 136, 138 is coming directly from the network 110.

The controller 122 by way of the serial management bus 140 provides a system operator the ability to configure, monitor and control each of the communications devices (128, 130, 132, 134, 136, 138) LIUs (114, 116, 118, 120) and concentrators (154, 156). The controller 122 also provides nonvolatile storage for the use of the communications devices, LIUs and concentrators.

Communication devices 128, 132, 136 are coupled to digital terminal access bus 142. Digital terminal access bus 142 provides a multiplexed bus for aggregation of the user data streams from communications devices 128, 132, 136. The digital terminal access bus 142 may have a carrier sensor 135. The carrier sensor 135 detects whether any communication devices 128, 132, 136 coupled to the digital terminal access bus 142 is using the digital terminal access bus 142.

The digital terminal access bus 142 allows multiple access. Multiple access allows any of the communication devices 128, 132, 136 coupled to the digital terminal access bus 142 to access the digital terminal access bus at any time. Thus, communication devices 128, 132, 136 connected to the digital terminal access bus are not constrained to specific time slices.

Because multiple access is allowed, the digital terminal access bus 142 may also have a collision detector 133. A collision detector 133 determines whether two or more communication devices 128, 132, 136 coupled to the digital terminal access bus 142 attempt to communicate over the digital terminal access bus 142 at the same time. If so, collision detector 133 determines which of the two or more communication devices 128, 132, 136 has priority for accessing the digital terminal access bus 142.

Communication devices 128, 136 are connected directly to digital terminal 144, 148, respectively. Controller 122, by way of serial management bus 140, determines whether communication devices 128, 136 communicates directly with digital terminal 144, 148 (respectively) or with the digital terminal access bus 142.

Communication devices 130, 134, 138 are connected solely to digital terminal 146, 150, 152. Communication device 132 is connected only with the digital terminal access bus 142.

Digital terminal access bus 142 is coupled to concentrators 154, 156. Concentrators 154, 156 (take the aggregated data from the multiplexed streams present on the digital terminal access bus 142 and provide access through single connections to data from multiple data communication devices. This eliminates the necessity for a separate wired connection for each data communication device. Concentrators 154, 156 are coupled to a local area network 158. (While a local area network is shown, any other type of network could be used.)

Concentrators 154, 156 are coupled to controller 122. Concentrators 154, 156 could be redundant for backup purposes, or the concentrators 154, 156 could be connected to separate networks.

A system so configured provides a number of unique advantages. First, it is significantly smaller than existing implementations, requiring a single rack of equipment instead of three. As a result, it is also significantly less expensive. Second, it is much easier to install and maintain that other existing implementations, eliminating the mass of cabling that is usually associated with an installation of this type. Instead, a single LAN connection and a single network connection can service an entire rack. Third, dynamic slot assignment capability creates a unique advantage, providing a way that hot standby devices can be brought on line to replace failed devices without physically removing and reinserting cards. As a result of these and other advantages, a system as described herein provides a more complete, capable, flexible, and maintainable telecommunications solution than any of the prior art systems.

We claim:

1. A communication system for coupling a plurality of data terminals to a first telephone network, comprising:

a first time division multiplexed telephone network access bus, providing a first plurality of time division slots containing data, coupled to the telephone network and to a plurality of communication devices, so as to provide access by the communication devices to the first plurality of time division slots;

a second time division multiplexed telephone network access bus coupled to a second telephone network for providing a second plurality of time division slots containing data and to the plurality of communication devices, so as to provide access by the communication devices to the second plurality of time division slots, the first plurality of time division slots independent from the second plurality of time division slots;

a digital terminal access bus coupled to the plurality of communication devices, each communication device being configurable to access any of the time division slots, the digital terminal access bus providing a multiplexed bus for the aggregation of data from the communication devices; and a controller coupled to the communication devices for configuring each communication device to access a time division slot.

2. The system of claim 1 where the digital terminal access bus has a carrier sensor.

3. The system of claim 2 where the digital terminal access bus allows multiple access.

4. The system of claim 3 where the digital terminal access bus has a collision detector.

5. The system of claim 4 where the time division slots have different durations.

6. The system of claim 4 where the time division slots have the same duration.

7. The system of claim 6 further comprising a control bus coupling the controller to the communication devices.

8. The system of claim 7 where the control bus is a serial bus.

9. The system of claim 8 where the control bus uses hardware addressing to access the communication devices.

10. The system of claim 9 where at least one communication device is directly coupled to the first telephone network.

11. The system of claim 10 where the at least one communication device is also coupled to the first time division multiplexed telephone network access bus.

12. The system of claim 4 where at least one communication device is coupled directly to a data terminal.

13. The system of claim 12 where the at least one communication device coupled directly to a data terminal is also coupled to the digital terminal access bus.

14. The system of claim 13 where the communication device is selectively configurable to access directly the data terminal or the digital terminal access bus.

15. The system of claim 7 including a primary line interface unit coupling the telephone network to the first time division multiplexed telephone network access bus.

16. The system of claim 15 further comprising a backup line interface unit coupling the telephone network to the time division multiplexed telephone network access bus.

17. The system of claim 16 where the controller selectively enables either the primary line interface unit or the backup line interface unit.

18. The system of claim 7 further comprising a primary concentrator coupled to the digital terminal access bus and to a third network.

19. The system of claim 18 where the third network is a local area network.

20. The system of claim 18 where the third network is a third telephone network.

21. The system of claim 18 further comprising a backup concentrator coupled to the digital terminal access bus and to the third network.

22. The system of claim 21 where the controller selectively enables either the primary concentrator or the backup concentrator.

23. A communication system for coupling a plurality of data terminals to a telephone network, comprising:

a first time division multiplexed telephone network access bus, providing a first plurality of time division slots containing data, coupled to the telephone network and to a plurality of communication devices, so as to provide access by the communication devices to the first plurality of time division slots;

a second time division multiplexed telephone network access bus coupled to the telephone network for providing a backup to the first time division multiplexed telephone network access bus and becoming operable if the first time division multiplexed telephone network access bus fails;

a digital terminal access bus coupled to the plurality of communication devices, each communication device being configurable to access any of the time division slots, the digital terminal access bus providing a multiplexed bus for the aggregation of data from the communication devices; and a controller coupled to the communication devices for configuring each communication device to access a time division slot.

24. The system of claim 23 where the digital terminal access bus has a carrier sensor.

25. The system of claim 24 where the digital terminal access bus allows multiple access.

26. The system of claim 25 where the digital terminal access bus has a collision detector.

27. The system of claim 26 where the time division slots have different durations.

28. The system of claim 26 where the time division slots have the same duration.

29. The system of claim 26 further comprising a control bus coupling the controller to the communication devices.

30. The system of claim 29 where the control bus is a serial bus.

31. The system of claim 30 where the control bus uses hardware addressing to access the communication devices.

32. The system of claim 31 where at least one communication device is directly coupled to the telephone network.

33. The system of claim 32 where the at least one communication device is also coupled to the first and second time division multiplexed telephone network access bus.

34. The system of claim 33 where at least one communication device is coupled directly to a data terminal.

35. The system of claim 34 where the at least one communication device coupled directly to a data terminals is also coupled to the digital terminal access bus.

36. The system of claim 35 where the communication device is selectively configurable to access directly the data terminal or the digital terminal access bus.

37. The system of claim 36 including a primary line interface unit coupling the telephone network to the time division multiplexed telephone network access bus.

38. The system of claim 37 further comprising a backup line interface unit coupling the telephone network to the time division multiplexed telephone network access bus.

39. The system of claim 38 where the controller selectively enables either the primary line interface unit or the backup line interface unit.

40. The system of claim 39 further comprising a primary concentrator coupled to the digital terminal access bus and to a third network.

41. The system of claim 40 where the third network is a local area network.

42. The system of claim 41 where the third network is a third telephone network.

43. The system of claim 42 further comprising a backup concentrator coupled to the digital terminal access bus and to the third network.

44. The system of claim 43 where the controller selectively enables either the primary concentrator or the backup concentrator.

* * * * *